US006374652B1

(12) United States Patent
Hwang

(10) Patent No.: US 6,374,652 B1
(45) Date of Patent: Apr. 23, 2002

(54) LOCKING DOORKNOB WHICH RECOGNIZES A FINGER PRINT

(75) Inventor: Moon Sung Hwang, Hwangmyng (KR)

(73) Assignee: Keico, Ltd., Seoul (KR)

( * ) Notice: Subject to any disclaimer, the term of this patent is extended or adjusted under 35 U.S.C. 154(b) by 0 days.

(21) Appl. No.: 09/419,640

(22) Filed: Oct. 18, 1999

(30) Foreign Application Priority Data

Aug. 20, 1999 (KR) ........................................... 99-34642

(51) Int. Cl.[7] ............................ E05B 47/00; G06K 9/00

(52) U.S. Cl. .......................... 70/277; 70/278.1; 70/283; 292/350; 340/5.53; 382/124

(58) Field of Search ................................ 70/283, 278.1, 70/277; 382/124–126; 340/5.53, 5.83, 5.7; 292/350

(56) References Cited

U.S. PATENT DOCUMENTS 5,018,375 A * 5/1991 Tully ........................ 70/283 X
5,421,178 A * 6/1995 Hamel et al. ................. 70/283
5,685,182 A * 11/1997 Chhatwal ............... 70/278.3 X
5,694,798 A * 12/1997 Nunez et al. ................. 70/283
5,725,264 A * 3/1998 Villarreal .................... 292/347
5,729,334 A * 3/1998 Van Ruyven ................ 356/71
5,782,118 A * 7/1998 Chamberlain et al. .... 70/283 X
5,791,178 A * 8/1998 Chamberlain et al. ..... 70/278.3
5,963,657 A * 10/1999 Bowker et al. ............. 382/127
6,100,811 A * 8/2000 Hsu et al. ............... 382/126 X
6,158,259 A * 12/2000 Schmitz et al. ........ 70/278.1 X

* cited by examiner

*Primary Examiner*—Lloyd A. Gall
(74) *Attorney, Agent, or Firm*—Whitham, Curtis & Christofferson, P.C.

(57) ABSTRACT

A locking doorknob which recognizes a fingerprint, in which the detecting sensor of a fingerprint is installed on the spot of the doorknob that a thumb or other fingers are placed naturally as the door is being opened. The location of the detecting sensor of the fingerprint can be changed at the discretion of a user to correspond to such a location. During operation, as soon as a user holds the doorknob, his fingerprint is measured and searched, and if the fingerprint corresponds to a fingerprint previously input, the door is unlocked and the doorknob can be turned to open the door. In this way, fingerprint recognition and opening of the door are performed at the same time.

8 Claims, 4 Drawing Sheets

LOCKING DOORKNOB WHICH RECOGNIZES A FINGER PRINT

FIELD OF THE INVENTION

The present invention relates to a locking doorknob which recognizes a fingerprint and more particularly to a locking doorknob which recognizes a fingerprint and which is installed on the door in a house, an apartment, an office, a car or a safe. According to the present invention, when a person holds the doorknob, a door is to be opened when his fingerprint, as received by the detecting sensor of a fingerprint, corresponds to a fingerprint previously input.

BACKGROUND OF THE INVENTION

Previously, a locking doorknob exists that includes a sensor which recognizes a fingerprint input as belonging to a certain user. In such a system, the sensor has been installed in a place other than on the doorknob. In that case, when a person touches the sensor to measure his fingerprint, the door becomes unlocked if the fingerprint read by the detecting sensor corresponds to a fingerprint previously input.

That prior locking doorknob which recognizes the fingerprint has been applied to various kinds of doors using the above-mentioned function, however, when the prior locking doorknob has been used for an automobile door, the price is high. Furthermore, as mentioned above, the prior invention has been installed separately from a door and a controller so it is not conducive to be installed in a general place such as a house or an office.

In the case of manual doors, there is difficulty in opening the door because the detecting sensor is located separately from the doorknob. Therefore, a person still has to turn the doorknob in order to open the door after the identification is approved through the detecting sensor of a fingerprint. This requires a two-step procedure to actually open the door, which can be cumbersome for the user.

SUMMARY OF THE INVENTION

Thus, in order to solve the above-mentioned problems, the detecting sensor of a fingerprint of the present invention is installed on the spot of the doorknob that a thumb is placed naturally. So when a user holds the doorknob, his fingerprint is measured and searched, and if the fingerprint corresponds to a fingerprint previously input, the door is unlocked and the doorknob is turned to open the door. Therefore, fingerprint recognition and opening of the door are performed at the same time.

The present invention relates to a locking doorknob which recognizes a fingerprint and that is installed on the door in a house, an apartment, an office, a car or a safe. According to the present invention, when a person holds the doorknob, a door is to be opened when his fingerprint, as recognized by the detecting sensor of a fingerprint, corresponds to a fingerprint previously input.

The prior locking doorknob which recognizes a fingerprint has been applied to various kinds of doors using the above-mentioned function, however, when the prior locking doorknob has been used for an automobile door the price is high. Furthermore, the prior invention has been located separately from a door and a controller so it is not conducive to be installed in a general place such as a house or an office.

In the prior system, the detecting sensor of a fingerprint is located separately from the doorknob, so that a person has to turn the doorknob in order to open the door after the identification is approved through the detecting sensor of a fingerprint.

Thus, in order to solve the above-mentioned problems, the detecting sensor of a fingerprint of the present invention is installed on the spot of the doorknob that a thumb is placed naturally. So when someone holds the doorknob, his fingerprint is measured and searched, and if the fingerprint corresponds to a fingerprint previously input, the door is unlocked and the doorknob is turned to open the door. Therefore, fingerprint recognition and opening of the door are performed at the same time.

BRIEF DESCRIPTION OF THE ATTACHED DRAWINGS

Figure 7:
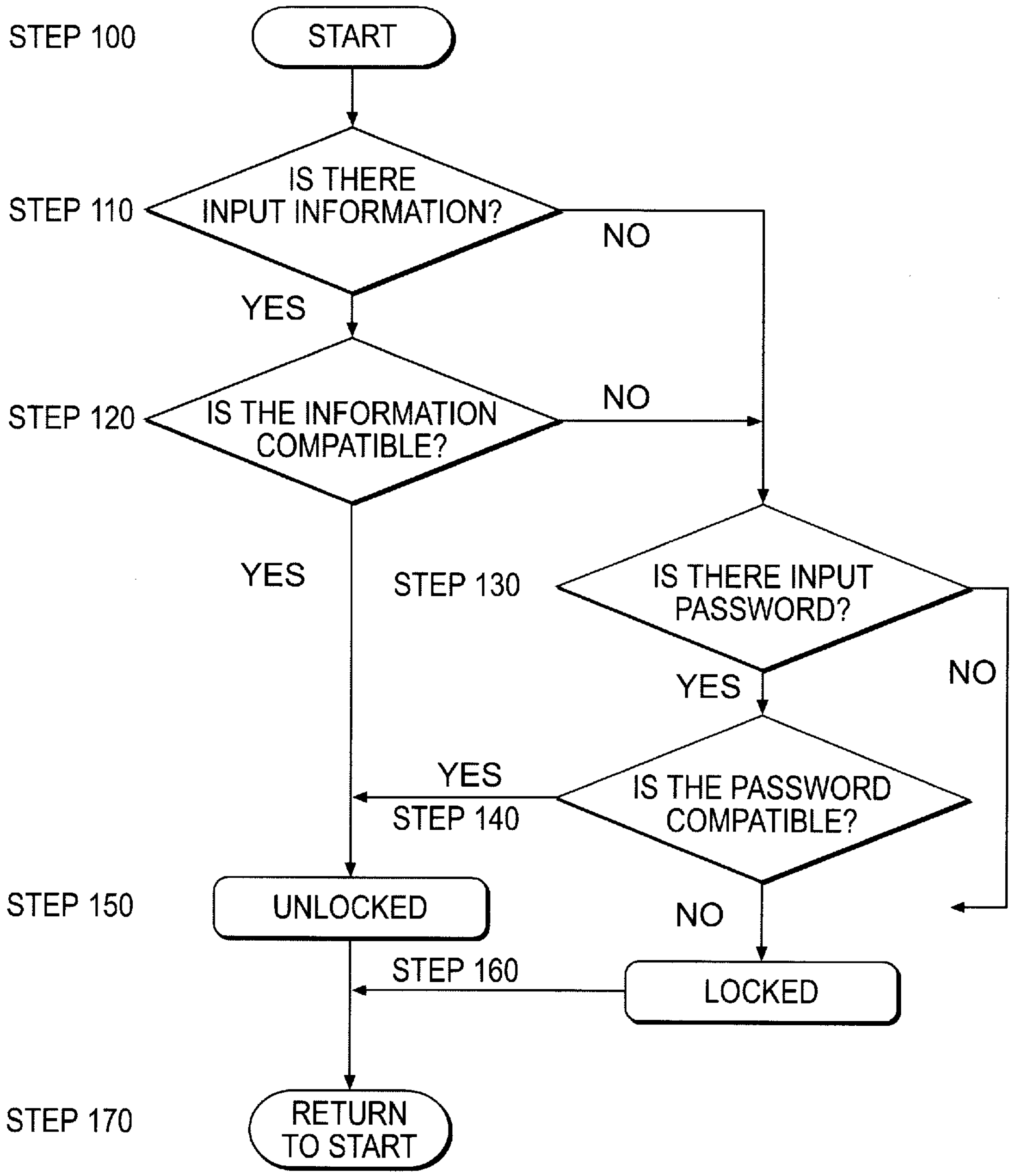

FIG. 7 a flowchart for the operation of a locking doorknob which recognizes a fingerprint in accordance with the present invention.

DETAILED DESCRIPTION OF THE PREFERRED EMBODIMENT

Figure 1:
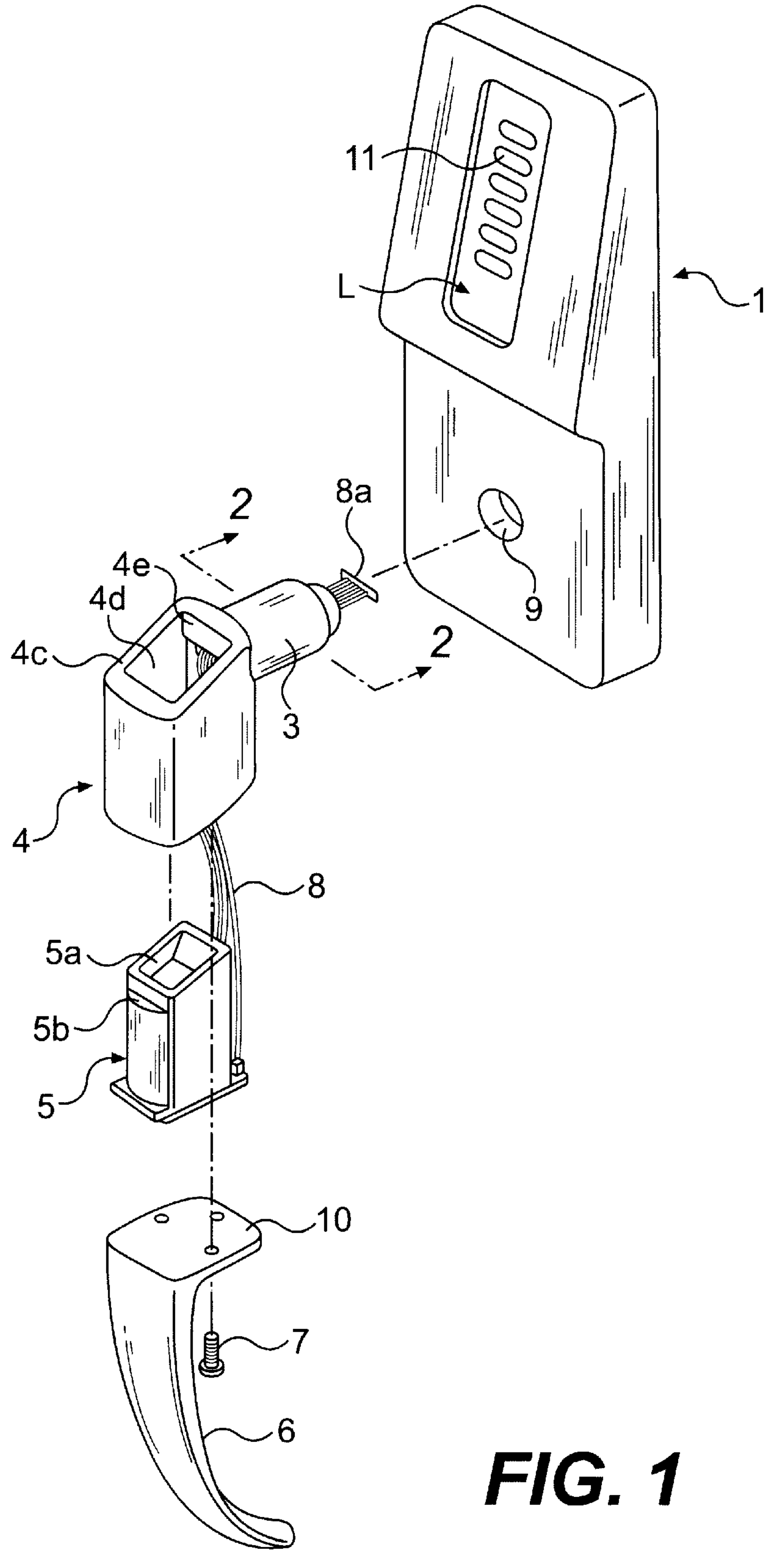
FIG. 1 is a perspective view according to an embodiment of the present invention.
Figure 3:
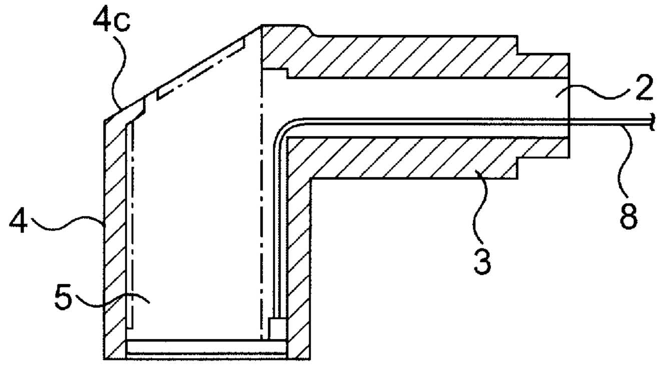
FIG. 3 is a cross sectional view of the detecting sensor of a fingerprint fitted into a doorknob in accordance with the present invention.
Figure 4:
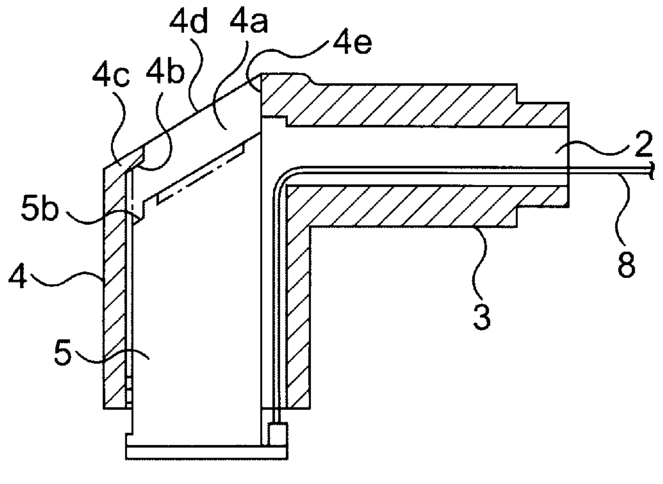
FIG. 4 is a cross sectional view of the process in which the detecting sensor of a fingerprint fits into the portion for enclosing the detecting sensor of a fingerprint in accordance with the present invention.

As shown in FIG. 1, the door-lock operation shaft (3), which fits into the perforation (9) on the lower part of the door-lock case (1), operates a locking apparatus (not shown in the figures) that is formed in the door-lock case (1). A passing flute (2) (see FIGS. 2–4), which is formed inside of the above door-lock operation shaft (3), surrounds a length of wire (8) connected to a detecting sensor of a fingerprint (5). The door-lock operation shaft (3) further connects at a right angle to a portion for enclosing the detecting sensor of a fingerprint (4). (See FIGS. 1, 3 and 4.) The wire (8) passes through at a right angle to an inside part **(4*a*) of the portion for enclosing the detecting sensor of a fingerprint (4) (see FIG. 4) into which is inserted the detecting sensor of a fingerprint (5)**.

Figure 5:
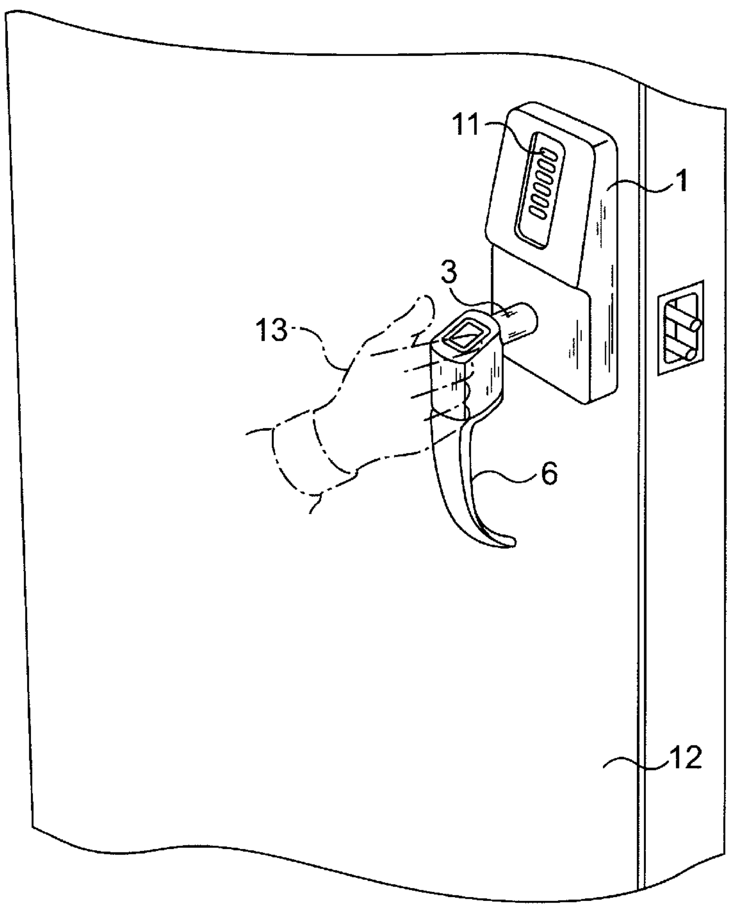
FIG. 5 is a perspective view of the use of the present invention.

The inside part of the portion for enclosing the detecting sensor of a fingerprint **(4*a*) is conjoined with a cover (10) which is attached to a doorknob (6) by screws (7). As shown in FIG. 5, the entire assembly can be attached to a door (12) so it can be engaged by a user's hand (13)**.

The forward area of the inside part of the portion for enclosing the detecting sensor of a fingerprint **(4*a*) (see FIG. 4) is formed at an incline (4*c*) (see FIGS. 1, 3–4) in order that a window recognizing fingerprint (5*a*) (see FIG. 1) of the detecting sensor of a fingerprint (5) (see FIGS. 1, 3–4) may have an angle of inclination. The incline (4*c*) is to have the opening part (4*d*) (see FIGS. 1, 4) in order that a window recognizing fingerprint (5*a*) may be exposed and a sill for support (4*e*) (see FIGS. 1, 4) is formed on the lower part of the opening part (4*d*) to facilitate holding inside a length of wire (8)** so that it looks good and is convenient to use.

Furthermore, an outwardly extending sill **(5*b*) (see FIGS. 1, 4) is formed on the top of the detecting sensor of a fingerprint (5) and an inwardly extending complementary sill (4***b*) (see FIG. 4) is formed in the inside part of the portion for enclosing the detecting sensor of a fingerprint (4*a*) in order to prevent the detecting sensor of a fingerprint (5) from slipping to the forward area when the detecting sensor of a fingerprint (5) is placed on the inside part of the portion for enclosing the detecting sensor of a fingerprint (4*a*).

Figure 2:
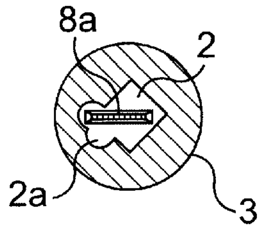
FIG. 2 is a cross sectional view of the part 2—2 of the present invention.

As shown in FIG. 2, a sub-passing flute (2*a*) is formed at a side of the passing flute (2), which is formed in the door-lock operation shaft (3) to pass through at a right angle to the inside part of the portion for enclosing the detecting sensor of a fingerprint (4*a*), in order that a jack/connector (8*a*) of the length of wire (8) (see FIG. 3) of the detecting sensor of a fingerprint (5) may be inserted and removed.

Confidential information about the present invention is preserved by assembling the various components of the invention (shown in the exploded view of FIG. 1) such that only the window recognizing portion of the fingerprint sensor (5*a*) is exposed when the invention is fully assembled (shown in the assembled view of FIG. 5).

Figure 6:
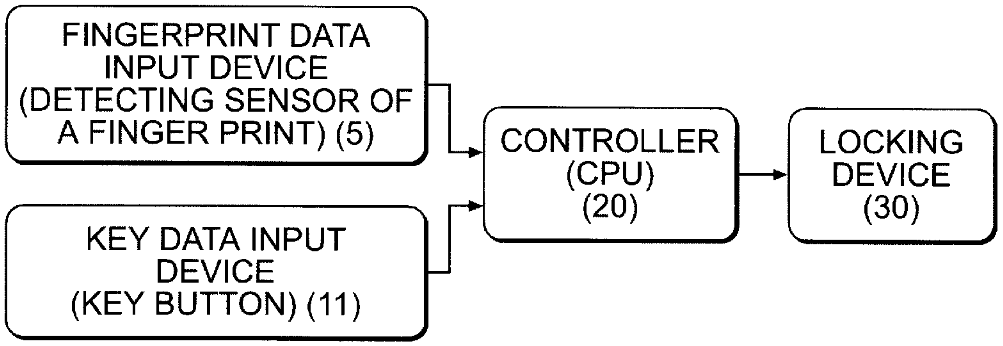
FIG. 6 is a flowchart for the linked-operation of the present invention.

According to the above description, as shown in FIG. 6, the data previously input into memory (i.e., previously stored fingerprints) is compared with the data input through the fingerprint data input device (i.e., the detecting sensor of a fingerprint (5)) or the Key data input device (i.e., key button (11)). The key button (11) is also depicted in relation to the door-lock case (1) in FIGS. 1 and 5. According to the result of this comparison, a controller (20), which controls the locking apparatus (30), and the locking apparatus (30), which controls the door-lock operation shaft (3), determines whether the device is to be operated or not (i.e., whether the door will unlock).

As shown in FIG. 7, when data is input by the detecting sensor of a fingerprint (5) (step 110), the data is interpreted whether or not it is compatible with the data previously stored in the memory (step 120). After that, if it is compatible with the data previously stored in the memory, the door is to be unlocked (step 150), or else, the process returns to the first step, step 100, via step 170.

On the other hand, in the case where no data is input at step 110 (i.e., the answer to step 110 is "no"), a test is made as to whether or not a password is input through the key button (11) (step 130). If the password is input by the key button (11), the password input is interpreted whether or not it is compatible with the password previously input in the memory (step 140). Also, when the password is compatible with the number previously input in the memory (i.e., the answer to step 140 is "yes"), the door is to be unlocked (step 150). Otherwise, the process returns to step 100.

In a normal situation without any operation (i.e., no input information and no input password), the door-lock is to be locked at all times and the process follows the path from step 110, to step 130, to step 160, to step 170, and back to step 100. This can be seen by reference to FIG. 7.

Thus, as shown in FIG. 5, when a person whose fingerprint has previously been input into memory holds the doorknob (6) (see FIG. 1) to open the door (12) and puts his finger (13) onto the window recognizing fingerprint (5*a*) (see FIG. 1) of the detecting sensor of a fingerprint (5), a lamp (L-FIG. 1), which is formed in the door-lock case (1) (see FIG. 1), turns on and the door is to be opened.

As an additional feature, in the case that a certain time elapses, the entire process is to be reinstated in order to restrain another's entrance.

As described above, by reference to FIG. 5, the detecting sensor of a fingerprint (5) is formed in the door-lock operation shaft (3), which is combined with the doorknob (6). Detecting a fingerprint on the spot of the doorknob that a thumb is placed naturally makes it function easily as when a person holds and turns a normal doorknob to open the door.

Furthermore, the detecting sensor of a fingerprint (5) can be operated not only by a thumb, but also by other fingers by changing the direction of the detecting sensor of fingerprint (5), for example, so that a left-handed person can input the fingerprint of his left hand.

The present invention has great merit for the doors of places or goods that are required to be locked for preservation of security and for opening the door conveniently.

What is claimed is:

1. A locking doorknob which recognizes a fingerprint and unlocks a door upon recognition of the fingerprint, comprising:

a detecting sensor of a fingerprint for measuring a fingerprint of a user, said sensor having a length of wire attached; and a door-lock operation shaft, having a portion that receives and encases a portion of said sensor, including the length of wire, said door-lock operation shaft being adapted to receive a door handle, whereby said sensor is encased within said portion of said shaft, the door becoming unlocked whenever the user grips the door handle and the measured fingerprint is recognized.

2. The locking doorknob which recognizes a fingerprint and unlocks a door upon recognition of the fingerprint, as claimed in claim 1, wherein a forward area of an inside portion of said door-lock operation shaft is formed as an incline to allow a window recognizing portion of said sensor to have an angle of inclination, the incline being open in order that said window recognizing portion may be exposed, and a sill for support is formed on a lower portion of an opening part of said door-lock operation shaft to facilitate holding inside the length of wire without the wire being exposed or damaged.

3. The locking doorknob which recognizes a fingerprint and unlocks a door upon recognition of the fingerprint, as claimed in claim 2, wherein said door-lock operation shaft further includes an interior passing flute, the passing flute being at a right angle to an inside portion of said door-lock operation shaft in order that a connector of the length of wire of said sensor may be inserted and removed.

4. The locking doorknob which recognizes a fingerprint and unlocks a door upon recognition of the fingerprint, as claimed in claim 3, wherein a sub-passing flute is formed at one side of said passing flute for carrying the length of wire along an inner portion of said door-lock operation shaft.

5. The locking doorknob which recognizes a fingerprint and unlocks a door upon recognition of the fingerprint, as claimed in claim 1, further comprising a door-lock case, which houses a locking apparatus; said door-lock case being adapted to be mounted on a door and being further adapted to receive an end of said door-lock operation shaft so that the door can be opened by gripping the door handle and actuating the door-lock operation shaft.

6. The locking doorknob which recognizes a fingerprint and unlocks a door upon recognition of the fingerprint, as claimed in claim 5, wherein said door-lock case is equipped with key buttons and associated electronics for receiving a password input from a user, as an alternative to measuring and recognizing a user's fingerprint, the locking doorknob becoming unlocked whenever the password input matches a password previously stored in memory.

7. The locking doorknob which recognizes a fingerprint and unlocks a door upon recognition of the fingerprint, as claimed in claim 1, further comprising a lamp formed inside said door-lock case, said lamp becoming illuminated whenever the door becomes unlocked and signifying that the door is to be opened.

8. The locking doorknob which recognizes a fingerprint and unlocks a door upon recognition of the fingerprint, as claimed in claim 1, wherein after a predetermined time limit elapses, the process of unlocking the door, either by measuring and recognizing a fingerprint or by inputting a password, is reinstated in order to restrain another's unauthorized entrance.

* * * * *